(12) United States Patent
Wang et al.

(10) Patent No.: US 10,481,869 B1
(45) Date of Patent: Nov. 19, 2019

(54) MULTI-PATH FUSED MULTIPLY-ADD WITH POWER CONTROL

(71) Applicant: Apple Inc., Cupertino, CA (US)

(72) Inventors: Liang-Kai Wang, Austin, TX (US); Ting Yu, Austin, TX (US); Yu Sun, Austin, TX (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 15/809,648

(22) Filed: Nov. 10, 2017

(51) Int. Cl.
| G06F 7/485 | (2006.01) |
| G06F 9/30  | (2018.01) |
| G06F 9/38  | (2018.01) |
| G06F 7/487 | (2006.01) |

(52) U.S. Cl.
CPC .............. *G06F 7/485* (2013.01); *G06F 7/487* (2013.01); *G06F 9/30014* (2013.01); *G06F 9/3893* (2013.01)

(58) Field of Classification Search
CPC ................................ G06F 7/483; G06F 9/3893
USPC ........................................................ 708/501
See application file for complete search history.

(56) References Cited

U.S. PATENT DOCUMENTS

| 8,037,118 | B2 * | 10/2011 | Quinnell ................. G06F 7/483 708/501 |
| 8,577,948 | B2 | 11/2013 | Srinivasan et al. |
| 8,892,619 | B2 | 11/2014 | Galal et al. |
| 9,152,382 | B2 | 10/2015 | Hickmann et al. |
| 9,778,907 | B2 * | 10/2017 | Elmer .................. G06F 7/49957 |
| 2012/0072703 | A1 * | 3/2012 | Srinivasan ............ G06F 9/3893 712/221 |
| 2018/0129474 | A1 * | 5/2018 | Ahmed .................... G06F 7/485 |

OTHER PUBLICATIONS

Peter-Michael Seidel, Multiple Path IEEE Floating-Point Fused Multiply-Add, Computer Science and Engineering Dept, SMU, IEEE 2004, p. 1359-1362 (Year: 2004).*
J. Preiss et al., Advanced Clockgating Schemes for Fused-Multiply-Add-Type Floating-Point Units, 2009 19th IEEE International Symposium on Computer Arithmetic, IEEE Computer Society, 2009 p. 48-56 (Year: 2009).*
Eric Quinnell, et al. "Floating-Point Fused Multiply-Add Architectures," IEEE, 2007, pp. 331-337.

* cited by examiner

*Primary Examiner* — Andrew Caldwell
*Assistant Examiner* — Emily E Larocque
(74) *Attorney, Agent, or Firm* — Meyertons, Hood, Kivlin, Kowert & Goetzel, P.C.

(57) ABSTRACT

Techniques are disclosed relating to circuitry configured to perform floating-point operations such as fused multiply-addition (FMA) with multiple paths and power control. In some embodiments, an FMA unit includes a near path and multiple far paths and is configured to select a path based on a determined exponent difference. In some embodiments, the FMA unit is configured to operate portions of non-selected paths in a low power state.

20 Claims, 6 Drawing Sheets

US 10,481,869 B1

MULTI-PATH FUSED MULTIPLY-ADD WITH POWER CONTROL

BACKGROUND

Technical Field

This disclosure relates generally to floating-point circuitry and more particularly to circuitry with multiple paths and power control that is configured to perform fused multiply-addition.

Description of the Related Art

Some computer processors are configured to execute instructions of an instruction set architecture (ISA) that includes fused multiply-add (FMA) operations for floating-point numbers. These operations perform a multiplication of first and second input operands, add a third operand to the result, and then perform rounding and exception checking on the result of the addition. (The use of the term "fused" means that the addition is performed without first rounding a result of the multiplication). Floating point circuitry may consume substantial power in a processor (e.g., a central processing unit or graphics processing unit).

Figure 1:
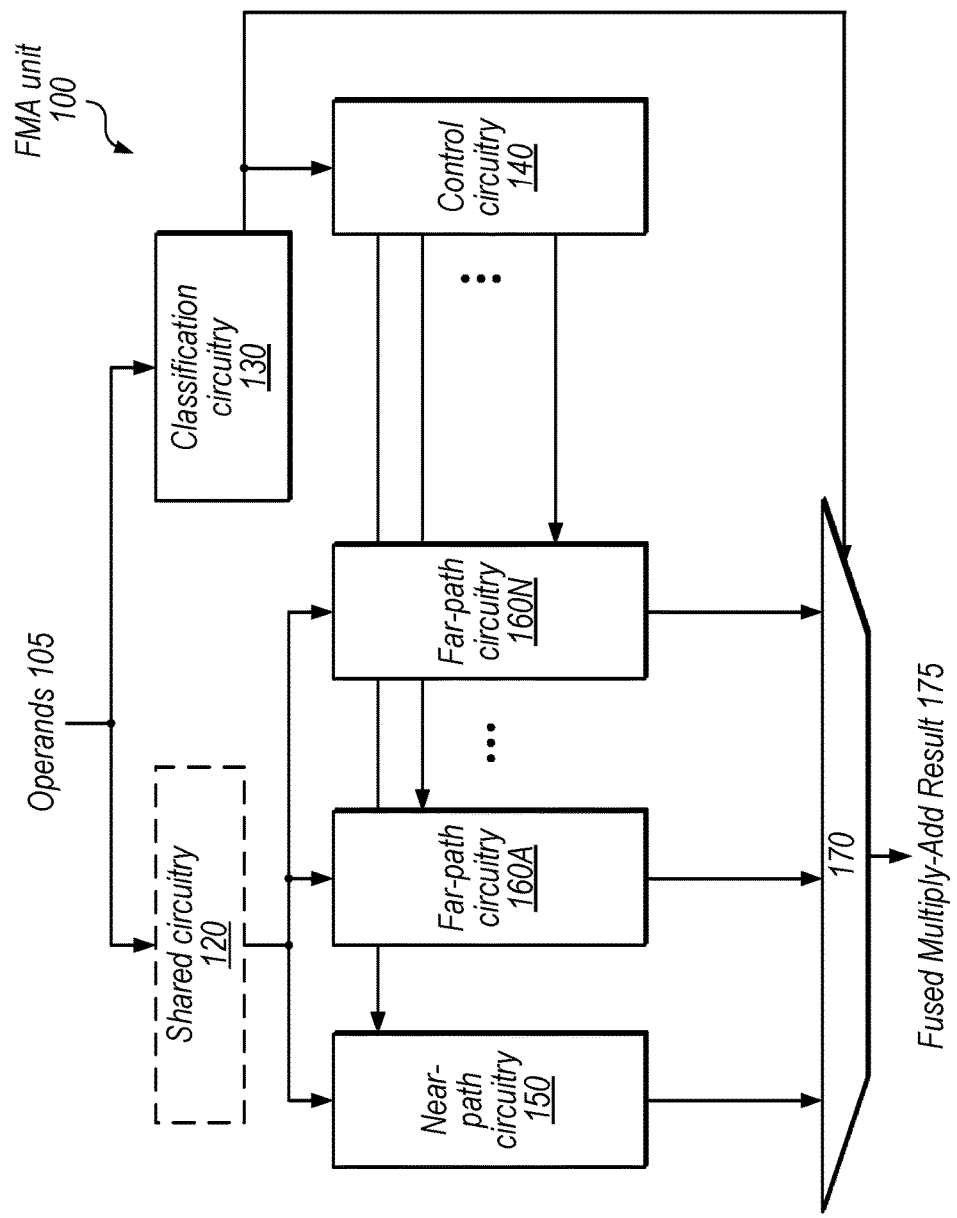
FIG. 1 is a block diagram illustrating an exemplary pipelined fused multiply add (FMA) unit that includes multiple paths and power control circuitry, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "right-shift circuit configured to shift an input value" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 2:
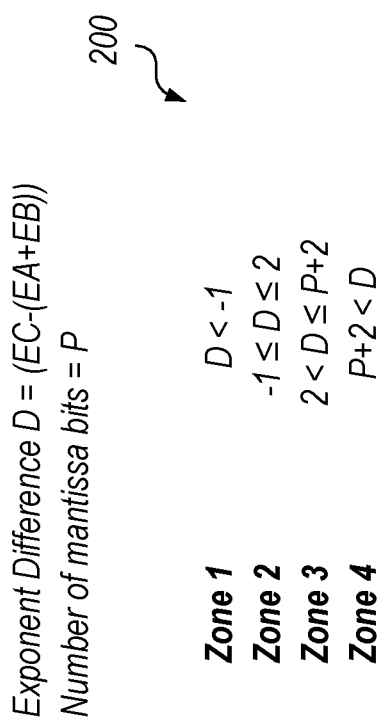
FIG. 2 is a diagram illustrating exemplary zones for classification of FMA operations for assignment to different paths, according to some embodiments.
Figure 3:
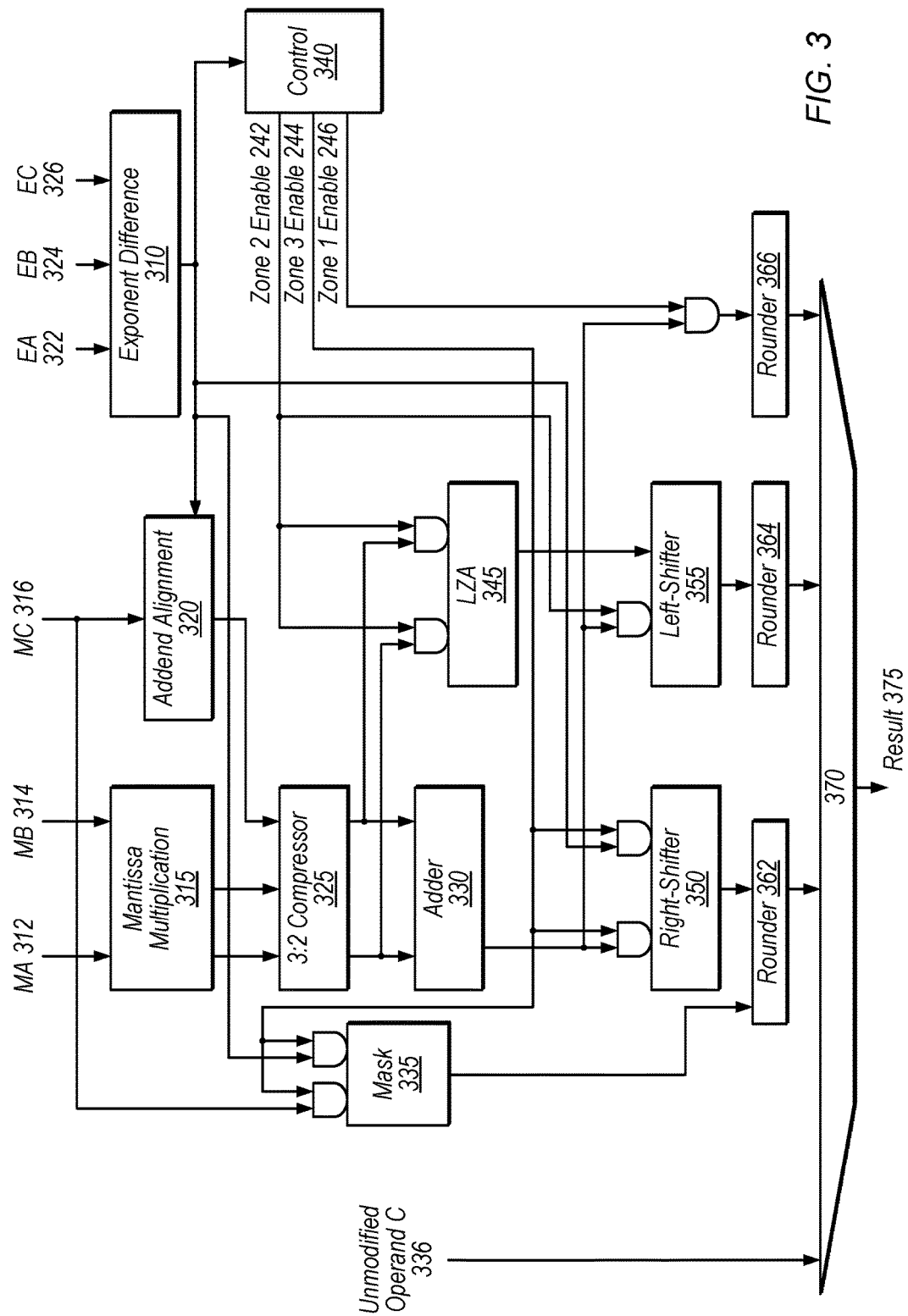
FIG. 3 is a block diagram illustrating a specific four-path example with data gating, according to some embodiments.
Figure 4:
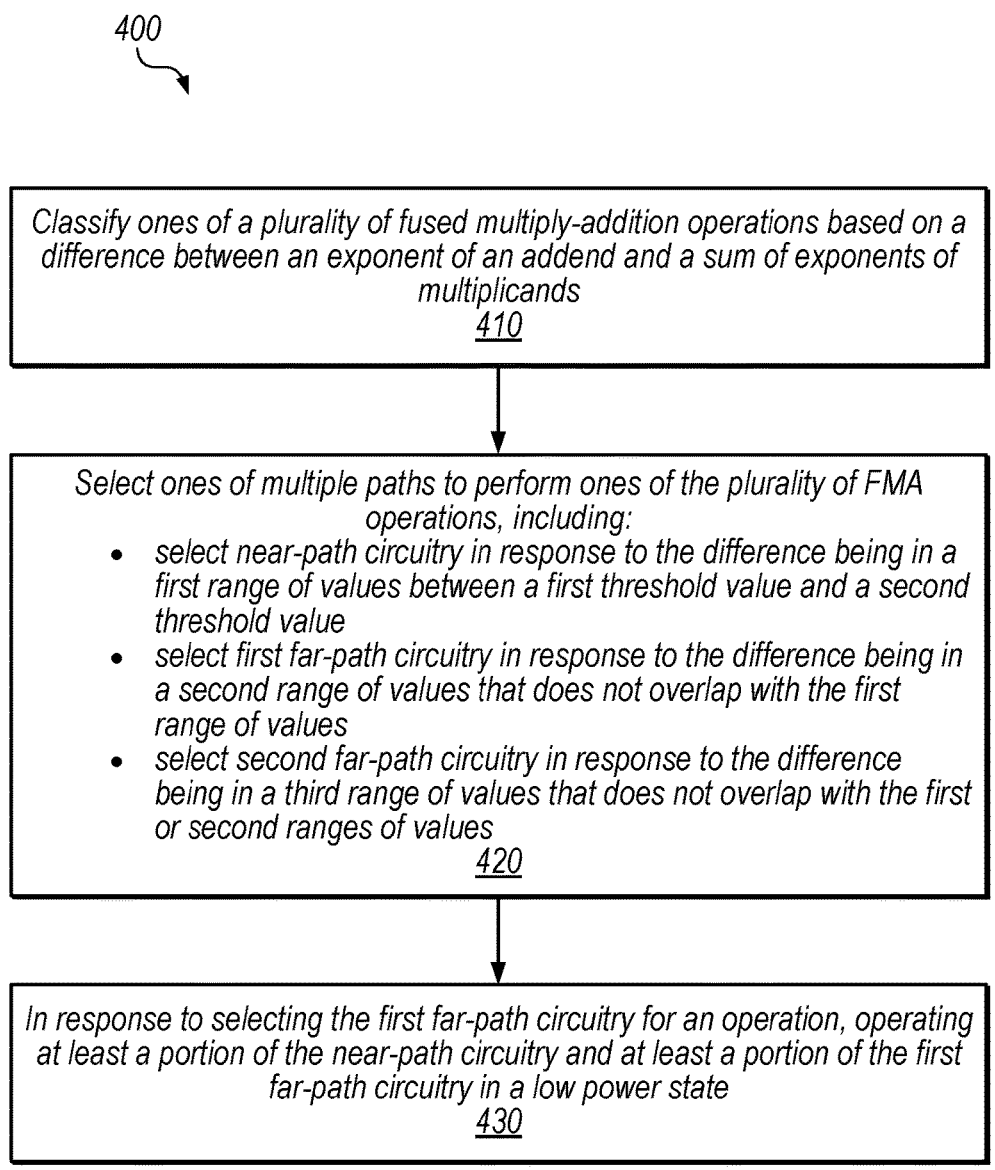
FIG. 4 is a flow diagram illustrating an exemplary method, according to some embodiments.
Figure 5:
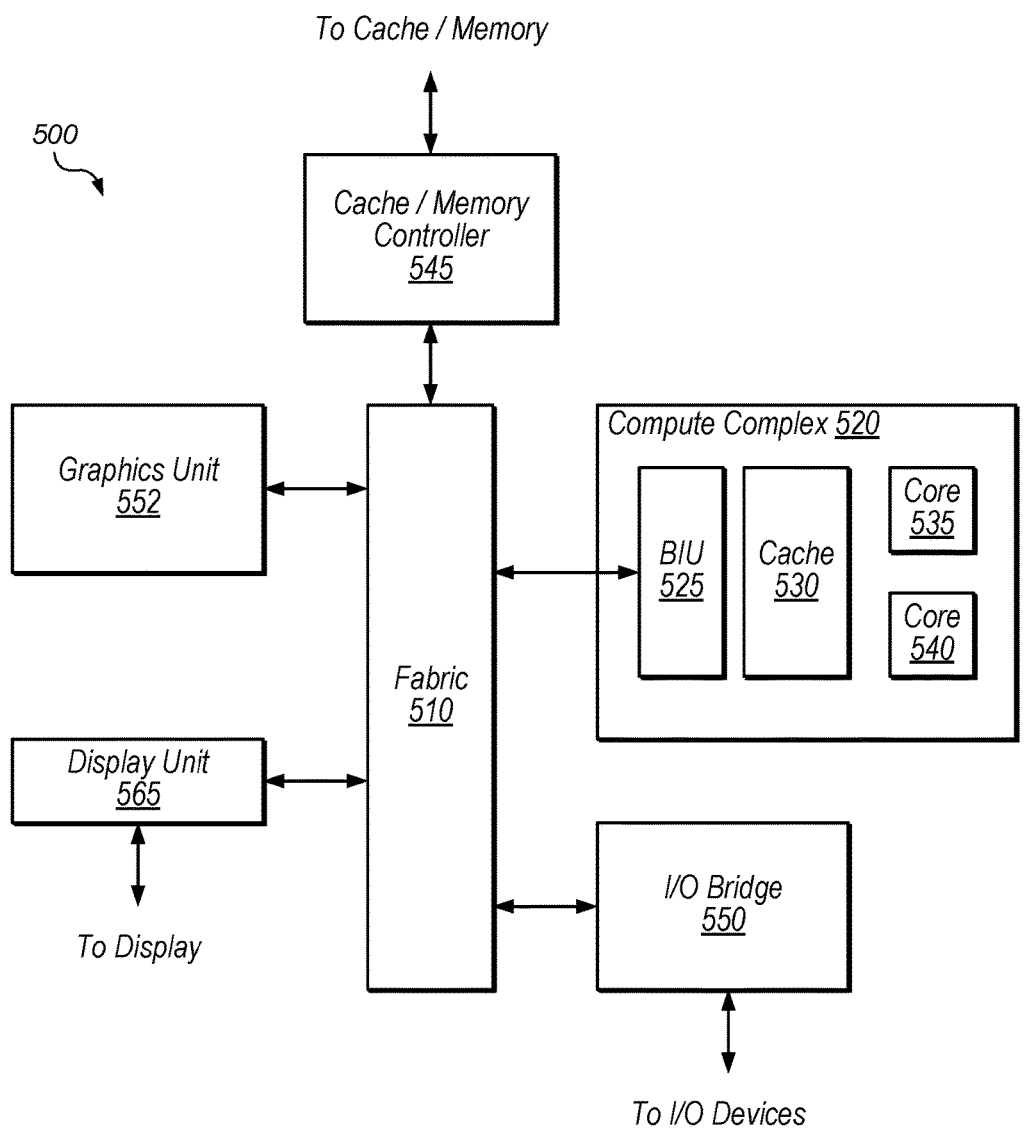
FIG. 5 is a block diagram illustrating an exemplary device, according to some embodiments.
Figure 6:
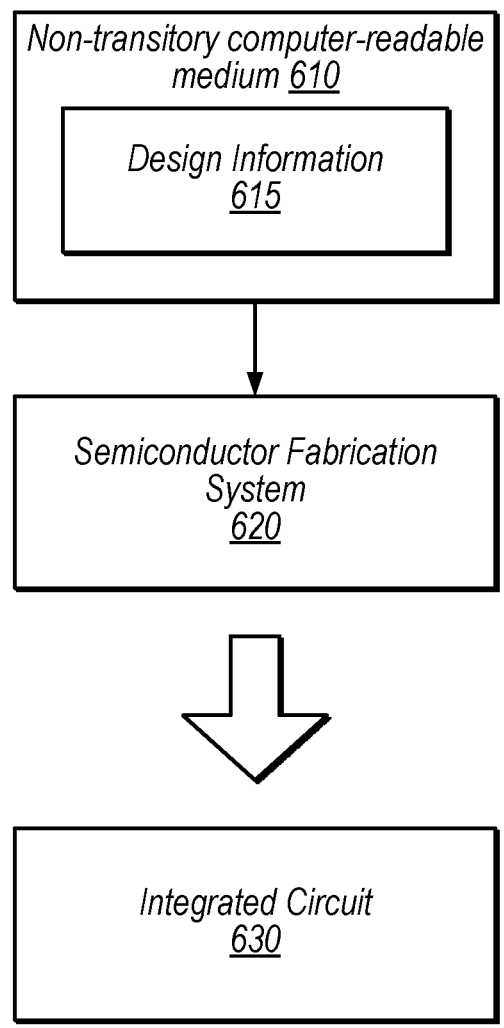
FIG. 6 is a diagram illustrating an exemplary computer-readable medium that stores design information, according to some embodiments.

This disclosure initially describes, with reference to FIG. 1, an overview of an FMA unit with multiple paths and power control. FIGS. 2 and 3 illustrate an exemplary four-zone implementation. FIGS. 4-6 illustrate an exemplary method, device, and computer-readable medium, respectively. In various embodiments, the disclosed techniques may provide lower power consumption and/or higher performance, relative to traditional implementations.

Exemplary Floating Point Unit with Multiple Far Paths and Power Control

FIG. 1 is a block diagram illustrating an exemplary fused multiply-add (FMA) unit 100. In the illustrated embodiment, FMA unit 100 is configured to receive a set of operands 105 for FMA operations and generate a corresponding FMA result 175. For example, in some embodiments FMA unit 100 is configured to receive floating-point operands A, B, and C, compute a value A×B+C to its full precision, and round the result to N significant bits, where N corresponds to the precision of the result of the FMA operation. In this context, operands A and B are referred to as multiplicands and operand C is referred to as an addend.

Some FMA implementations may characterize floating-point operations as either "near-path" or "far-path" based on the difference in exponents between operations (e.g., based on the value of EC−(EA+EB) where "Ex" refers to the exponent of operand x).

In various disclosed embodiments, multiple types of far-path circuitry are implemented and classification circuitry 130 is configured to assign a given operation to either near-path circuitry or one of the types of far-path circuitry based on exponents of the input operands. Some circuitry in a FMA unit may be dedicated for either near-path or a certain type of far-path operation in the sense that this circuitry is not used for other types of operations.

FMA unit 100, in the illustrated embodiment, includes shared circuitry 120, classification circuitry 130, control circuitry 140, near-path circuitry 150, multiple types of far-path circuitry 160A-160N, and a multiplexer 170. Note that various ones of the paths (and FMA unit 100 in general) may be pipelined. The concept of "pipelined" circuitry is well understood, and refers to the concept of splitting the "work" that circuitry performs on instructions into multiple stages. Many different pipeline architectures are possible with varying orderings of elements/portions. Various pipeline stages perform processing steps and then pass intermediate results on to other stages for further processing until a final result is achieved. A pipeline "stage" is configured to receive input data in a given clock cycle and produce a result (e.g., to pass to a subsequent stage) prior to the end of the clock cycle. Although specific divisions into stages are not explicitly shown in FIG. 3, various elements may be included in a particular stage or split into multiple stages, in various embodiments. Storage elements such as flops may be implemented to store results at the edge of each pipeline stage.

Shared circuitry 120, in the illustrated embodiment, is shared between multiple paths. It may include, for example, multiplication circuitry for multiplying mantissas of the A and B input operands, a compressor, and/or an adder. Shared circuitry 120 is shown using dashed lines because it may be omitted in some embodiments (e.g., in embodiments in which each path is completely separate). Sharing certain circuitry may reduce area, however, and still may allow fine-granularity power control.

Classification circuitry 130, in the illustrated embodiment, is configured to select a path to perform a given operation based on exponents of the input values. In the illustrated embodiment, classification circuitry 130 is configured to indicate the selection to control circuitry 140 and MUX 170.

Control circuitry 140, in some embodiments, is configured to operate circuitry included in one or more non-selected paths in a low-power mode. MUX 170, in some embodiments, is configured to pass the output from the selected path as FMA result 175.

Near-path circuitry 150, in some embodiments, is configured to perform left-shifting, leading zero detection (LZD) or leading zero anticipation (LZA), and rounding, for example. Different types of far-path circuitry 160, in some embodiments, are configured to perform rounding, shifts, etc., depending on their type. FIG. 3, described in further detail below, provides examples of different types of far-path circuitry.

Referring now to FIG. 2, table 200 shows exemplary zones for classification of operands, according to some embodiments. In the illustrated example, there are four zones, with zone 2 corresponding to a near path and zones 1 and 3-4 corresponding to different types of far paths.

As shown, an exponent difference D is determined as EC−(EA+EB) and the value P represents the number of mantissa bits in the floating-point precision used for the operands. In the illustrated example, an operation is classified as zone 1 if D is smaller than negative one. In the illustrated example, an operation is classified as zone 2 if D is greater than or equal to negative one and smaller than or equal to two. In the illustrated example, an operation is classified as zone 3 if D is greater than two and smaller than or equal to P plus two. In the illustrated example, an operation is classified as zone 3 if D is greater than P plus 2.

Path circuitry for zone 1 may be configured to perform mantissa multiplication, addition, and rounding. In some embodiments, massive cancelation does not occur in zone 1 in embodiments that do not explicitly handle denormal inputs (e.g., by flushing denormal inputs to zero, which may occur in various GPU embodiments). Further, the first potentially non-zero bit of the product may be at position 2P. Further, the most significant bit of the result may always be at 2P+2, 2P+1, 2P, or 2P−1 in zone 1, in some embodiments. Therefore, shifting of addition results or leading zero detection/anticipation may not be needed in zone 1.

Path circuitry for zone 2 may be configured to perform mantissa multiplication, addend alignment, addition, leading zero detection or anticipation, left shift based on the leading zero analysis, and rounding. In some embodiments, circuitry for zone 2 consumes the most dynamic power, from among the illustrated zones. Massive cancellation may occur in zone 2.

Path circuitry for zone 3 may be configured to perform right shifting of the product, appending of the result to upper bits of the addend, and rounding. In some embodiments, massive cancelation does not occur in zone 3.

Path circuitry for zone 4, in some embodiments, may be configured to simply provide operand C as a result 175. In some embodiments, operand C may not be modified, e.g., because product bits may contribute to sticky bits but not a rounding bit and the rounding bit may not affect the result in certain rounding modes (e.g., round-to-nearest-even).

The illustrated zones are included for purposes of illustration but are not intended to limit the scope of the present disclosure. In other embodiments, zones may cover different ranges of values, different numbers of zones may be implemented, etc. In various embodiments, including multiple far-path zones may reduce power consumption by providing increased granularity for power control circuitry.

Exemplary Four-Path Circuit Implementation

FIG. 3 is a block diagram illustrating an exemplary FMA unit with power control and four paths (one near path for zone 2 and three far paths for zones 1 and 3-4). In the illustrated embodiment, the FMA unit is configured to receive inputs for three operands A, B, and C and generate result 375. In the illustrated embodiment, the inputs include a mantissa of operand A (MA) 312, a mantissa of operand B (MB) 314, a mantissa of operand C (MB) 316, an exponent of operand A (EA) 322, an exponent of operand B (EB) 324, and an exponent of operand C (EC) 326. In the illustrated embodiment, the FMA unit includes exponent difference circuitry 310, mantissa multiplication circuitry 315, addend alignment circuitry 320, 3:2 compressor 325, adder 330, mask circuitry 335, control circuitry 340, LZA circuitry 345, right-shifter 350, left-shifter 355, rounder circuits 362, 364, and 366, and MUX 370.

Exponent difference circuitry 310, in some embodiments, is configured to determine the exponent difference EC−(EA+EB). In the illustrated embodiment, this output is used by control circuitry 340 to select a path for performing the FMA operation, to determine an amount of shift for addend alignment by circuitry 320, to determine a mask by circuitry 335, and/or to determine a shift amount by right-shifter 350.

Mantissa multiplication circuitry 315, in the illustrated embodiment, is configured to multiply MA and MB to generate a multiplication result (which may have twice the precision of the input operands). Circuitry 315 may implement one of various different multiplier topologies.

Addend alignment circuitry 320, in the illustrated embodiment, is configured to align MC 316 based on the determined exponent difference. This may align the mantissa of operand C to normalize it for proper addition with the result from multiplication circuitry 315.

Compressor 325, in the illustrated embodiment, is configured to combine the output of multiplication circuitry 315 with the aligned operand C mantissa to generate input values for adder 330. In other embodiments, a compressor may not be used. Using a compressor, however, may improve performance when summing three or more addends.

Adder 330, in the illustrated embodiment, is configured to add the outputs of compressor 325 and output the sum. The output of adder 330 may correspond to the result of A×B+C, but may require shifting and/or rounding before properly representing a FMA result. Negation/inversion and normalization circuitry (not explicitly shown), in some embodiments, is configured to negate (e.g., using 2's complement) or invert (e.g., using 1's complement) the output of adder 230 under certain conditions.

For zone 1, in the illustrated embodiment, rounder 366 is configured to round the output of adder 330, e.g., based on a specified rounding mode for the FMA operation. Control circuitry 340 is configured to data gate rounder 366 for other zones, in the illustrated embodiment, which may reduce or eliminate dynamic power consumption by this circuit. Note that, in some embodiments, zone 1 may involve a single potential right-shift, which is not explicitly shown in FIG. 3.

For zone 2, in the illustrated embodiment, LZA 345 is configured to perform leading zero anticipation for normalization of the output of adder 330 (e.g., to determine an amount of shift by left-shifter 355). In other embodiments, a leading zero detector may be used. LZA implementations may provide improved performance relative to LZD implementations, however. In some embodiments, the determination regarding leading zeros may facilitate handling massive cancelation, e.g., as caused by subtraction or a negative C operand. In the illustrated embodiment, left-shifter 355 is configured to normalize the output of adder 330 based on the input from LZA 355. Rounder 364, in the illustrated embodiment, is configured to round the output of left-shifter 355 if needed, e.g., based on a specified rounding mode.

In the illustrated embodiment, the inputs to LZA 345 and left-shifter 355 are data gated for other zones. This may substantially reduce dynamic power consumption by elements 345, 355, and 364 in some embodiments.

For zone 3, in the illustrated embodiment, right-shifter 350 is configured to right-shift the output of adder 330 based on the exponent different from circuitry 310. Mask circuitry 335, in the illustrated embodiment, is configured to mask lower bits or MC 316 (e.g., bits into which right-shifter 350 is configured to shift the adder results) based on the exponent difference. The output of right-shifter 350, in the illustrated embodiment, is appended to the masked value and rounded by rounder 362, if needed. In the illustrated embodiment, the inputs to right-shifter 350 and mask circuitry 335 are data gated for other zones. In some embodiments, rounders 362, 264, and 366 each have corresponding increment circuitry configured to perform a round up if needed.

For zone 4, in the illustrated embodiment, operand C 336 is simply provided, unmodified, as the result.

MUX 370, in the illustrated embodiment, is configured to select the output of the appropriate path based on the exponent difference generated by circuitry 310 and output result 375. In some embodiments, MUX 370 is controlled based on the combination of signals 242, 244, and 246. Note that various circuitry that may be implemented to correctly provide FMA results are not explicitly shown in FIG. 3 such as: negation (e.g., for subtraction), inversion, increment (e.g., when needed for rounding), exponent addition, etc. FIG. 3 is shown for purposes of illustration and includes exemplary gating for circuit elements that may often consume substantial power, but this figure is not intended to limit the scope of the present disclosure.

As discussed above, in the illustrated embodiment, control circuitry 340 is configured to data gate elements that are not being used for a given operation (e.g., elements in non-selected paths). In other embodiments, other techniques may be used to operate circuitry in unselected paths in a low-power state. In addition to data gating, other examples of techniques for operating circuitry in a low-power state include: power gating, clock gating, etc. For clock gating embodiments, signals 242, 244, and 246 may be generated similarly to the embodiment shown in FIG. 3, but may be provided to clock gating circuits to indicate whether clock gating should be performed for a given element, for example (rather than used as input signals to data gates as shown in FIG. 3).

In some embodiments, additional power control may be implemented. For example, various elements may be operated in a low power state (including, without limitation 315, 320, 325, and 330) for clock cycles corresponding to operations in zone 4, for example.

In some embodiments, implementing multiple far paths may increase circuit area, relative to designs with a single far path. The advantageous reduction in dynamic power consumption, however, may be considered more important than any such increase in area, in various designs. Speaking generally, using multiple far paths may also allow separation of rarely used and/or power-hungry paths, increasing the effectiveness of power control. The disclosed power saving may be particularly effective for high precision floating-point formats. Further, the disclosed techniques may have little or no effect on the timing critical path for FMA operations.

Statistical analysis of common workflows has shown that zone 1 may be most common, followed by zone 3 or 4 (e.g., depending on the precision) with zone 2 being least common. Zone 4 may be particularly common and zone 2 particularly uncommon for high precision operations (e.g., 64-bit or more). Therefore, the disclosed techniques may allow substantial gating of certain relatively power-hungry paths.

Exemplary Method

FIG. 4 is a flow diagram illustrating a method 400 for performing floating-point operations, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 410.

At 410, in the illustrated embodiment, classification circuitry (e.g., classification circuitry 130 or exponent difference circuitry 310) classifies ones of a plurality of fused multiply-addition operations based on a difference between an exponent of an addend and a sum of exponents of multiplicands.

At 420, in the illustrated embodiment, selection circuitry (e.g., control circuitry 140 and/or MUX 170) selects ones of multiple paths to perform ones of the plurality of FMA operations. In this illustrated embodiment, this includes to select near-path circuitry in response to the difference being in a first range of values between a first threshold value and a second threshold value, select first far-path circuitry in response to the difference being in a second range of values that does not overlap with the first range of values, and select second far-path circuitry in response to the difference being in a third range of values that does not overlap with the first or second ranges of values.

At 430, in the illustrated embodiment, control circuitry (e.g., control circuitry 130), in response to selecting the first far-path circuitry for an operation, operates at least a portion of the near-path circuitry and at least a portion of the first far-path circuitry in a low power state. This may include power gating, data gating, and/or clock gating portions of this circuitry. Similarly, when other paths are selected, at least a portion of the non-selected paths may be power gated.

Note that power control may be performed on only a portion of a given path, in particular in pipelined embodiments. For example, in the example of FIG. 3, the LZA 345 and left-shifter 355 may be data gated for a given operation even though other elements (e.g., 315, 320, 325, 364, etc.) used for the same path are operational in a given clock cycle (e.g., processing a previous or subsequent operation in a pipelined fashion).

In some embodiments, the selection further includes selecting third far-path circuitry in response to the difference being in a fourth range of values that does not overlap with the first, second, or third ranges of values. In some embodiments, the second range of values includes values of the difference smaller than −1; the first range of values includes values of the difference greater than or equal to −1 and smaller than or equal to 2; the third range of values includes values of the difference greater than 2 and smaller than or equal to N+2; and the fourth range of values includes values of the difference greater than N+2 (e.g., corresponding to the zones of FIG. 2).

In some embodiments, the near-path circuitry includes elements 345, 355, and 364 of FIG. 3. In some embodiments, the first far-path circuitry includes rounder 366. In some embodiments, the second far-path circuitry includes right-shifter 350 and rounder 362. In some embodiments, the third far-path circuitry is configured to pass unmodified operand C 336 to a MUX. In some embodiments, multiple paths share certain circuitry, such as elements 315, 320, 325, and 330 of FIG. 3 for example.

Exemplary Device

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 552, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 552 may be described as "coupled to" a memory through fabric 510 and cache/memory controller 545. In contrast, in the illustrated embodiment of FIG. 5, graphics unit 552 is "directly coupled" to fabric 510 because there are no intervening elements.

Graphics unit 552 may include one or more processors and/or one or more graphics processing units (GPU's). Graphics unit 552 may receive graphics-oriented instructions, such as OPENGL®, Metal, or DIRECT3D® instructions, for example. Graphics unit 552 may execute specialized GPU instructions or perform other operations based on the received graphics-oriented instructions. Graphics unit 552 may generally be configured to process large blocks of data in parallel and may build images in a frame buffer for output to a display. Graphics unit 552 may include transform, lighting, triangle, and/or rendering engines in one or more graphics processing pipelines. Graphics unit 552 may output pixel information for display images.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Exemplary Computer-Readable Storage Medium

FIG. 6 is a block diagram illustrating an exemplary non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable medium 610, may comprise any of various appropriate types of memory devices or storage devices. Medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 610 may include other types of non-transitory memory as well or combinations thereof. Medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabrication at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIG. 1, 3, or 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    pipelined multiplication circuitry that includes multiple pipeline stages and is configured to generate fused multiply-addition results;
    classification circuitry configured to classify fused multiply-addition operation based on a difference between an exponent of an addend and a sum of exponents of multiplicands;
    wherein the multiplication circuitry includes multiple paths and is configured to select paths for performing operations based on the classification, wherein the paths include:
        near-path circuitry configured to perform operations where the difference is in a first range of values between a first threshold value and a second threshold value;
        first far-path circuitry configured to perform operations where the difference is in a second range of values that does not overlap with the first range of values;
        second far-path circuitry configured to perform operations where the difference is in a third range of values that does not overlap with the first or second ranges of values; and
        third far-path circuitry configured to perform operations where the difference is in a fourth range of values that does not overlap with the first, second, or third ranges of values;
    wherein the apparatus is configured to, in response to the apparatus assigning a fused multiply-addition operation to the first far-path circuitry using the classification circuitry, operate at least a portion of the near-path circuitry and at least a portion of the second far-path circuitry in a low-power state.

2. The apparatus of claim 1, wherein the apparatus is configured to, in response to assigning a fused multiply-addition operation to the first far-path circuitry using the classification circuitry, operate at least a portion of the third far-path circuitry in a low-power state.

3. The apparatus of claim 1, wherein the multiplication circuitry is configured to operate on input values with N mantissa bits;
    wherein the second range of values includes values of the difference smaller than $-1$;
    wherein the first range of values includes values of the difference greater than or equal to $-1$ and smaller than or equal to 2;

wherein the third range of values includes values of the difference greater than 2 and smaller than or equal to N+2; and wherein the fourth range of values includes values of the difference greater than N+2.

4. The apparatus of claim 1, wherein, to operate the at least a portion of the near-path circuitry and the at least a portion of the first far-path circuitry in a low-power state, the apparatus is configured to perform one or more of: power gating, clock gating, or data gating.

5. The apparatus of claim 1, wherein the near-path circuitry includes leading zero anticipator circuitry and left-shift circuitry.

6. The apparatus of claim 1, wherein the near-path circuitry, the first far-path circuitry, and the second far-path circuitry are configured to share mantissa multiplication circuitry and an adder circuit.

7. The apparatus of claim 1, wherein the near-path circuitry includes a first rounding circuit, the first far-path circuitry includes a second rounding circuit, and the second far-path circuitry includes a third rounding circuit.

8. A non-transitory computer readable storage medium having stored thereon design information that specifies a design of at least a portion of a hardware integrated circuit in a format recognized by a semiconductor fabrication system that is configured to use the design information to produce the circuit according to the design, including:

pipelined multiplication circuitry that includes multiple pipeline stages and is configured to generate fused multiply-addition results;

classification circuitry configured to classify fused multiply-addition operation based on a difference between an exponent of an addend and a sum of exponents of multiplicands;

wherein the multiplication circuitry includes multiple paths and is configured to select paths for performing operations based on the classification, wherein the paths include:

near-path circuitry configured to perform operations where the difference is in a first range of values between a first threshold value and a second threshold value;

first far-path circuitry configured to perform operations where the difference is in a second range of values that does not overlap with the first range of values;

second far-path circuitry configured to perform operations where the difference is in a third range of values that does not overlap with the first or second ranges of values; and third far-path circuitry configured to perform operations where the difference is in a fourth range of values that does not overlap with the first, second, or third ranges of values wherein the circuit is configured to, in response to assigning a fused multiply-addition operation to the first far-path circuitry using the classification circuitry, operate at least a portion of the near-path circuitry and at least a portion of the first second far-path circuitry in a low-power state.

9. The non-transitory computer readable storage medium of claim 8, wherein the design information further specifies that the circuit is configured to, in response to assigning a fused multiply-addition operation to the first far-path circuitry using the classification circuitry, operate at least a portion of the third far-path circuitry in a low-power state.

10. The non-transitory computer readable storage medium of claim 8, wherein the design information further specifies that the multiplication circuitry is configured to operate on input values with N mantissa bits;

wherein the second range of values includes values of the difference smaller than −1;

wherein the first range of values includes values of the difference greater than or equal to −1 and smaller than or equal to 2;

wherein the third range of values includes values of the difference greater than 2 and smaller than or equal to N+2; and wherein the fourth range of values includes values of the difference greater than N+2.

11. The non-transitory computer readable storage medium of claim 8, wherein, to operate the at least a portion of the near-path circuitry and the at least a portion of the first far-path circuitry in a low-power state, the circuit is configured to perform one or more of: clock gating, or data gating.

12. The non-transitory computer readable storage medium of claim 8, wherein the near-path circuitry includes leading zero anticipator circuitry and left-shift circuitry.

13. The non-transitory computer readable storage medium of claim 8, wherein the near-path circuitry, the first far-path circuitry, and the second far-path circuitry are configured to share mantissa multiplication circuitry and an adder circuit.

14. The non-transitory computer readable storage medium of claim 8, wherein the near-path circuitry includes a first rounding circuit, the first far-path circuitry includes a second rounding circuit, and the second far-path circuitry includes a third rounding circuit.

15. A method, comprising:

classifying, by classification circuitry, ones of a plurality of fused multiply-addition operations based on a difference between an exponent of an addend and a sum of exponents of multiplicands;

selecting, by control circuitry, ones of multiple paths to perform ones of the plurality of fused multiply-addition operations, including:

selecting near-path circuitry in response to the difference being in a first range of values between a first threshold value and a second threshold value;

selecting first far-path circuitry in response to the difference being in a second range of values that does not overlap with the first range of values;

selecting second far-path circuitry in response to the difference being in a third range of values that does not overlap with the first or second ranges of values; and selecting third far-path circuitry in response to the difference being in a fourth range of values that does not overlap with the first, second, or third ranges of values; and in response to selecting the first far-path circuitry for an operation, operating at least a portion of the near-path circuitry and at least a portion of the first second far-path circuitry in a low-power state.

16. The method of claim 15, further comprising:

in response to selecting the first far-path circuitry for an operation, operating at least a portion of the third far-path circuitry in a low-power state.

17. The method of claim 15, wherein the operations have input values with N mantissa bits;

wherein the second range of values includes values of the difference smaller than −1;

wherein the first range of values includes values of the difference greater than or equal to −1 and smaller than or equal to 2;

wherein the third range of values includes values of the difference greater than 2 and smaller than or equal to N+2; and wherein the fourth range of values includes values of the difference greater than N+2.

18. The method of claim 15, wherein the operating the at least a portion of the near path circuitry and the first far path circuitry in a low power state includes data gating.

19. The method of claim 15, wherein the operating the at least a portion of the near path circuitry and the first far path circuitry in a low power state includes clock gating.

20. The method of claim 15, wherein the near-path circuitry uses a leading zero anticipator circuitry and left-shift circuitry.

* * * * *